US007956791B2

(12) United States Patent
Kuo et al.

(10) Patent No.: US 7,956,791 B2
(45) Date of Patent: Jun. 7, 2011

(54) REMOTE CONTROL DEVICE WITH IMPROVED SHIELDING AND GROUNDING PERFORMANCE

(75) Inventors: Peter Kuo, Tu-cheng (TW); Hao-Mai Yin, Kunshan (CN); Jiang-Hua Zhu, Kunshan (CN); Bing Du, Kunshan (CN)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 1092 days.

(21) Appl. No.: 11/786,132

(22) Filed: Apr. 10, 2007

(65) Prior Publication Data

US 2007/0247325 A1 Oct. 25, 2007

(30) Foreign Application Priority Data

Apr. 10, 2006 (CN) .......................... 2006 20 072334

(51) Int. Cl.
*H04L 17/02* (2006.01)

(52) U.S. Cl. ................... 341/176; 361/818; 439/607.01; 439/607.31; 174/372

(58) Field of Classification Search .................. 341/176; 455/349, 351; 361/818; 174/372; 439/607.01, 439/607.31
See application file for complete search history.

(56) References Cited

U.S. PATENT DOCUMENTS

| | | | | |
|---|---|---|---|---|
| 5,420,739 | A | 5/1995 | Yokozawa et al. | |
| 5,537,294 | A * | 7/1996 | Siwinski | 361/753 |
| 5,761,053 | A * | 6/1998 | King et al. | 361/818 |
| 6,211,457 | B1 * | 4/2001 | Cama et al. | 174/380 |
| 6,276,965 | B1 * | 8/2001 | Madsen et al. | 439/607.01 |
| 6,289,210 | B1 * | 9/2001 | Anderson et al. | 455/351 |
| 6,763,576 | B2 * | 7/2004 | Watchko et al. | 29/825 |
| 6,816,384 | B2 * | 11/2004 | Wu et al. | 361/759 |
| 6,999,323 | B1 * | 2/2006 | Aronson et al. | 361/753 |
| 7,003,106 | B2 * | 2/2006 | Ouyang | 380/28 |
| 7,063,767 | B1 * | 6/2006 | Tyson et al. | 156/304.3 |
| 7,197,294 | B2 * | 3/2007 | Anderson et al. | 455/349 |
| 7,229,315 | B2 * | 6/2007 | Zhang et al. | 439/607.31 |
| 7,446,265 | B2 * | 11/2008 | Krohto et al. | 174/377 |

* cited by examiner

*Primary Examiner* — Albert K Wong
(74) *Attorney, Agent, or Firm* — Andrew C. Cheng; Wei Te Chung; Ming Chieh Chang

(57) ABSTRACT

A remote control device (100) includes an insulated housing (2, 3) including an outer surface (20, 30) plated with a conductive material for providing a suppression of EMI, an inner surface (21, 31), and a receiving space (4) defined by the outer surface and the inner surface, a printed circuit board (51) received in the receiving space, and including at least a first conductive pad (511), and a second conductive pad electrically connected to the first conductive pad by conductive trace, a cable including at least one grounding conductor electrically connected to the second conductive pad, grounding means (22) electrically connected to the conductive material and the first conductive pad for providing a sheath for ESD generated on the remote control device.

3 Claims, 8 Drawing Sheets

REMOTE CONTROL DEVICE WITH IMPROVED SHIELDING AND GROUNDING PERFORMANCE

BACKGROUND OF THE INVENTION

1. Field of the Invention

The present invention is directed to a wire remote control device, and more specifically, to a wire remote control device to control and drive portable audio devices, such as compact disk (CD) player, MP3 Player, to operate in a remote location.

2. Description of Related Arts

The present commercial portable audio devices, such as CD player, Walkman or MP3 Player, generally uses a remote (wire) controller, which is connected to the portable audio devices via a cable link, for controlling functions such as volume, power, tape-play, etc remotely.

For example, U.S. Pat. No. 5,420,739 which issued to SMK Corporation on May 30, 1995 shows a conventional portable audio unit, a control unit connected to the portable audio unit by a cable. Audio signals are transmitted by the cable from the portable audio unit, to the control unit and to a connected earphone, control signals are transmitted from the control unit to the portable audio unit from controlling functions remotely.

For meeting variable requirements of the consumers, many remote controller manufacturers begin to use an insulated material to produce the exterior cover of the remote controller. However, the insulated cover provides no suppression of exterior EMI (Electro-Magnetic Interference) or RFI (radio-frequency interference) for the electric components received in the insulated cover, and sequentially make the signal transmission degrade. Further, excessive static charge crowded on the electric components cannot dissipate through the insulated cover, the remote controller has insufficient grounding performance to protect against electrostatic discharges (ESD).

Hence, a remote control device having improved shielding and grounding properties is desired.

SUMMARY OF THE INVENTION

Accordingly, the object of the present invention is to provide a remote control device having sufficient shielding and/or grounding properties to protect against EMI and/or ESD.

To achieve the above objects, a remote control device includes an insulated housing including an outer surface plated with a conductive material for providing a suppression of EMI, an inner surface, and a receiving space defined by the inner surface, a printed circuit board received in the receiving space, and including at least a first conductive pad, and a second conductive pad electrically connected to the first conductive pad by conductive trace, a cable including at least one grounding conductor electrically connected to the second conductive pad, grounding means electrically connected to the conductive material and the first conductive pad for providing a sheath for ESD generated on the remote control device.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
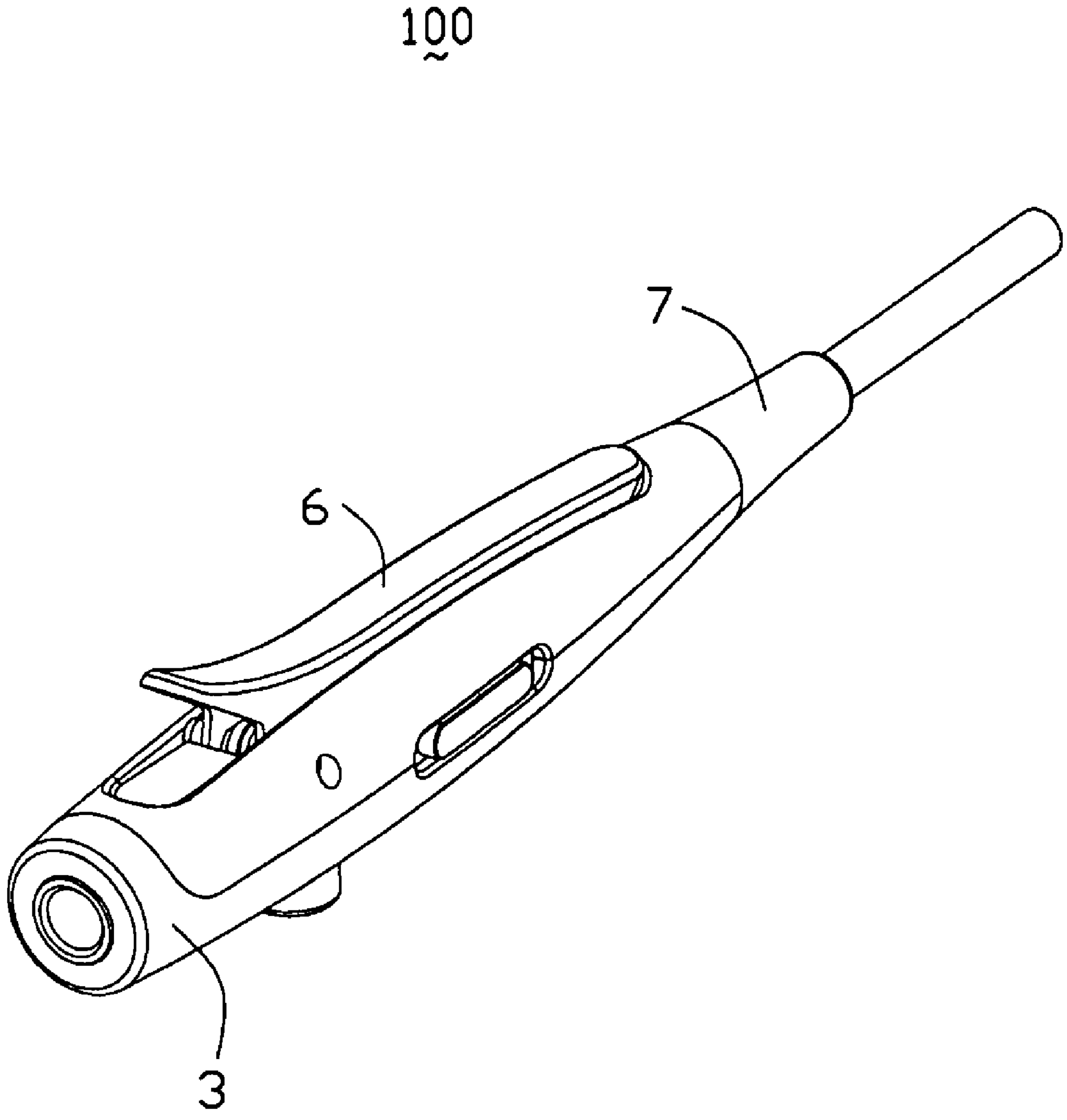
FIG. 1 is a perspective, assembled view of a remote control device in accordance with the present invention.
Figure 2:
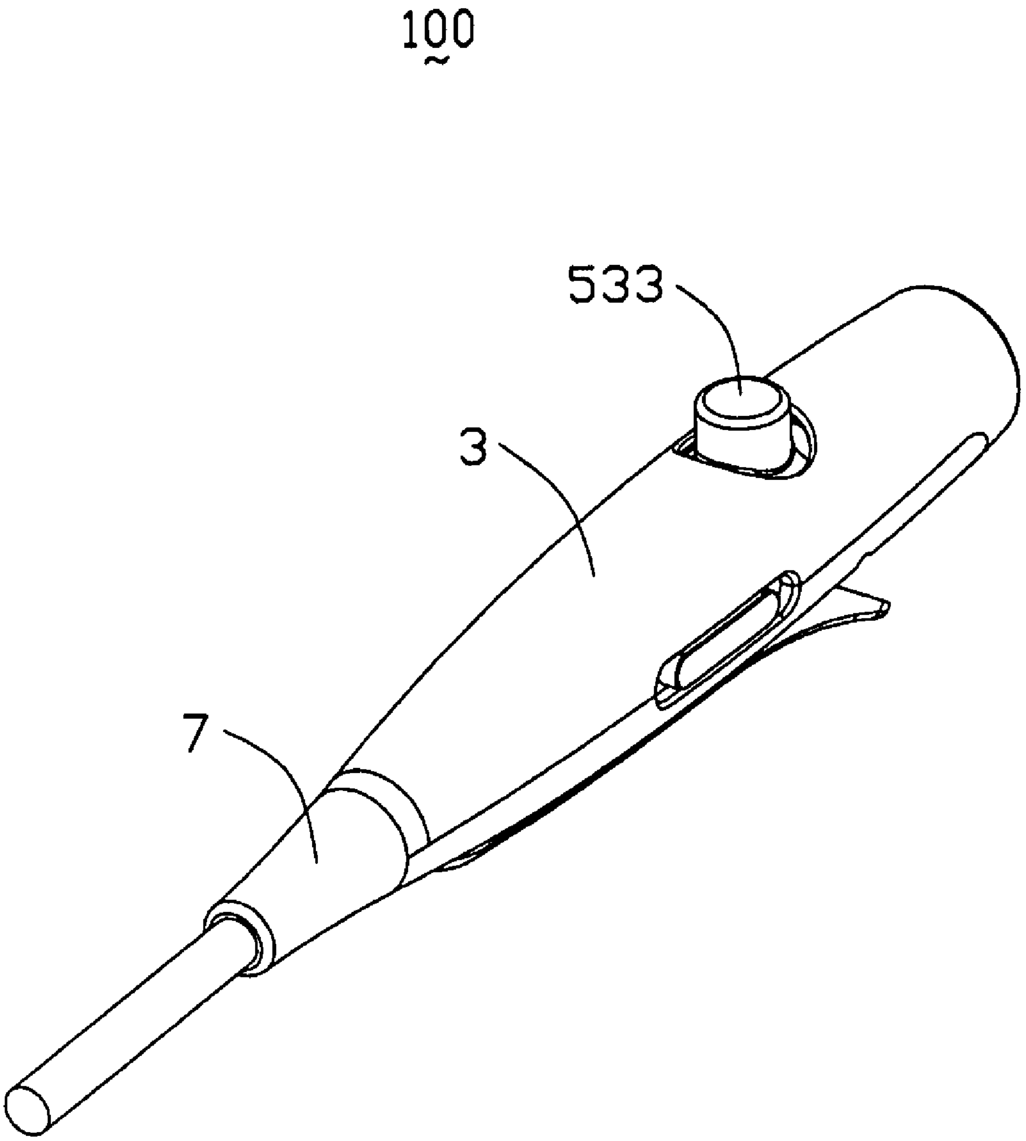
FIG. 2 is a view similar to FIG. 1, but taken from different aspect.

The remote control device 100 in according with the present invention, with respect to operation mode, is generally similar to the control unit depicted in applied reference, U.S. Pat. No. 5,420,739. The remote control device 100 may be attached to a portable audio device (not shown), audio signals or other type signals generated by the portable audio device are transmitted via a wire link from the portable audio device, to the remote control device 100 and to an earphone or a speaker (not shown) which is connected to the remote control device 100. Control signals generated by the remote control are transmitted via the wire link from the remote control device 100 to the portable audio device for controlling functions such as sound volume, power on and off, play and stop, fast-forwarding remotely and conveniently.

With respect to FIGS. 1-4, illustrate the remote control device 100 in according with the present invention. The remote control device 100 comprises a first housing piece 2 with a structure shaped like a boat, a second housing piece 3 attached to the first housing piece 2 and defining a receiving space 4 together with the first housing piece 2, a printed circuit board 51 received in the receiving space 4 and with a plurality of components (Detailed depiction shown hereinafter) located thereon, a cable 7 electrically connected to the printed circuit board 51 and a clip 6 pivotally attached to the first housing piece 2 for clipping the remote control device 100 to a user's clothing or handbag or on some other convenient object.

Figure 3:
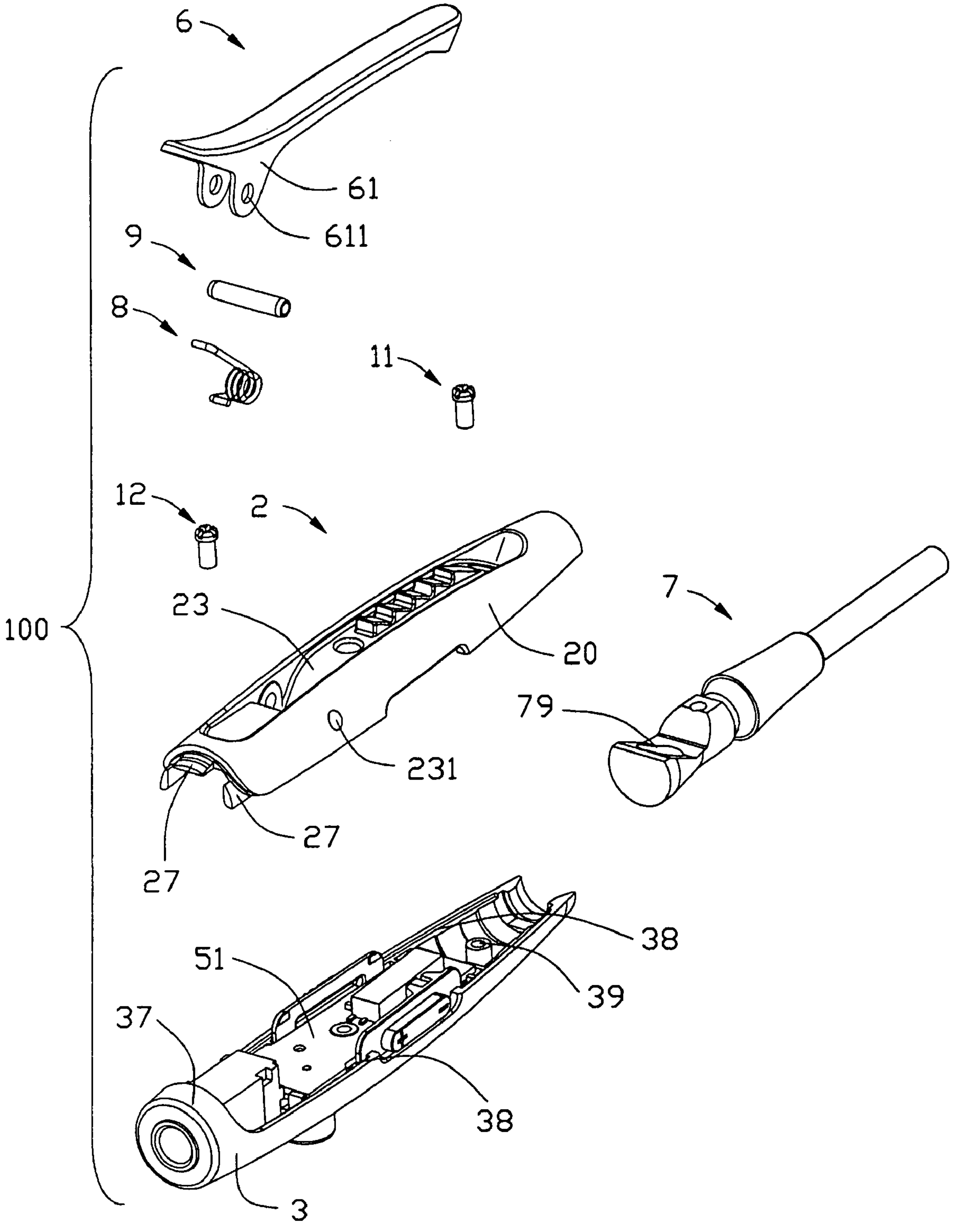
FIG. 3 is an exploded view of the remote control device shown in FIG. 1.
Figure 4:
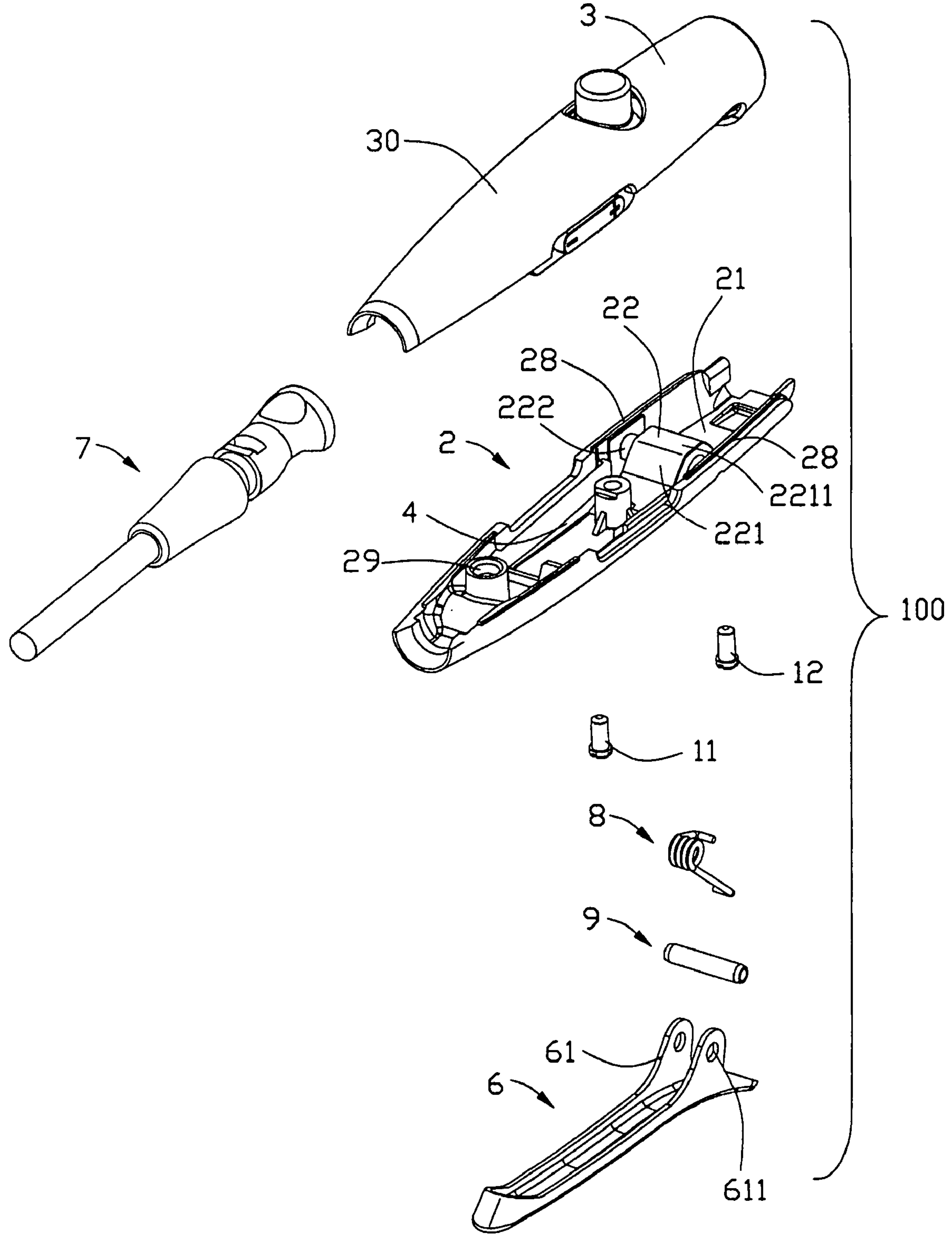
FIG. 4 is a view similar to FIG. 3, but taken from different aspect.

With respect to FIGS. 3-4, the fist housing piece 2 is formed of an insulated material with enough rigid, such as Acrylonitrile Butadiene Styrene (ABS), and comprises a main portion (not labeled) generally shaped as a boat, and three positioning piece 27 forwardly extending from the front of the main portion. The main portion defines an inner surface 21, an outer surface 20 opposite to the inner surface 21 and plated with a layer of conductive material, such as gold, nickel, for providing adequate suppression of EMI. In addition, a pair of posts (not labeled) is located on the back and middle of the main portion respectively, each post defines a hollow hole 29 extending through the main portion. A bar portion 22 is disposed between the positioning pieces 27 and the middle post along a rear-to-back direction, and comprises a base 221 projecting upwardly from the inner surface 21 and forming a flat top surface 2211, and a pair of columns 28 located at two lateral sides of the base 221 and shaped with a semi-circular sectional view. Similarly, the top surface 2211, and the pair of columns 28 are plated with a same conductive material as that of the outer surface 20, thereby establishing a conductive connection among the outer surface 20, the top surface 2211, and the pair of columns 28. In this preferred embodiment, the bar portion 22 plated with the conductive material is functioned as a grounding portion or a grounding means. The outer surface 20 further defines a recess portion 23, which corresponds to the projecting bar portion 22 for receiving and fixing the clip 6 with the first housing piece 2. In addition, a pair of locking holes 231 extends through the outer surface 20 and communicates with the recess portion 23.

With respect to FIGS. 2-5, the second housing piece 3 is similar to the first housing piece 2 in structure, and formed of a same insulated material with enough rigid as that of the first housing piece 2. This second housing piece 3 comprises a base portion (not labeled) generally shaped as a boat, and an annular portion 37 integrally shaped with the base portion. The annular portion 37 defines an inner space (not labeled) for guiding insertions of the positioning pieces 27 and preventing an unnecessary movement of the positioning pieces 27. An outer surface 30 of the second housing piece 3 is plated with the conductive material. To ensure a reliable mechanical connection between the first and second housing pieces 2, 3, the edges 28 of the first housing piece 2 engage with the edges 38 of the second housing piece 3 by an interference fit manner, or a locking manner. To ensure a complete sheath against EMI and ESD, not only the outer surfaces 20, 30, but also both edges 28, 38 and the surface between the edge 28 and the bar portion 22, are plated with the same conductive material.

Figure 5:
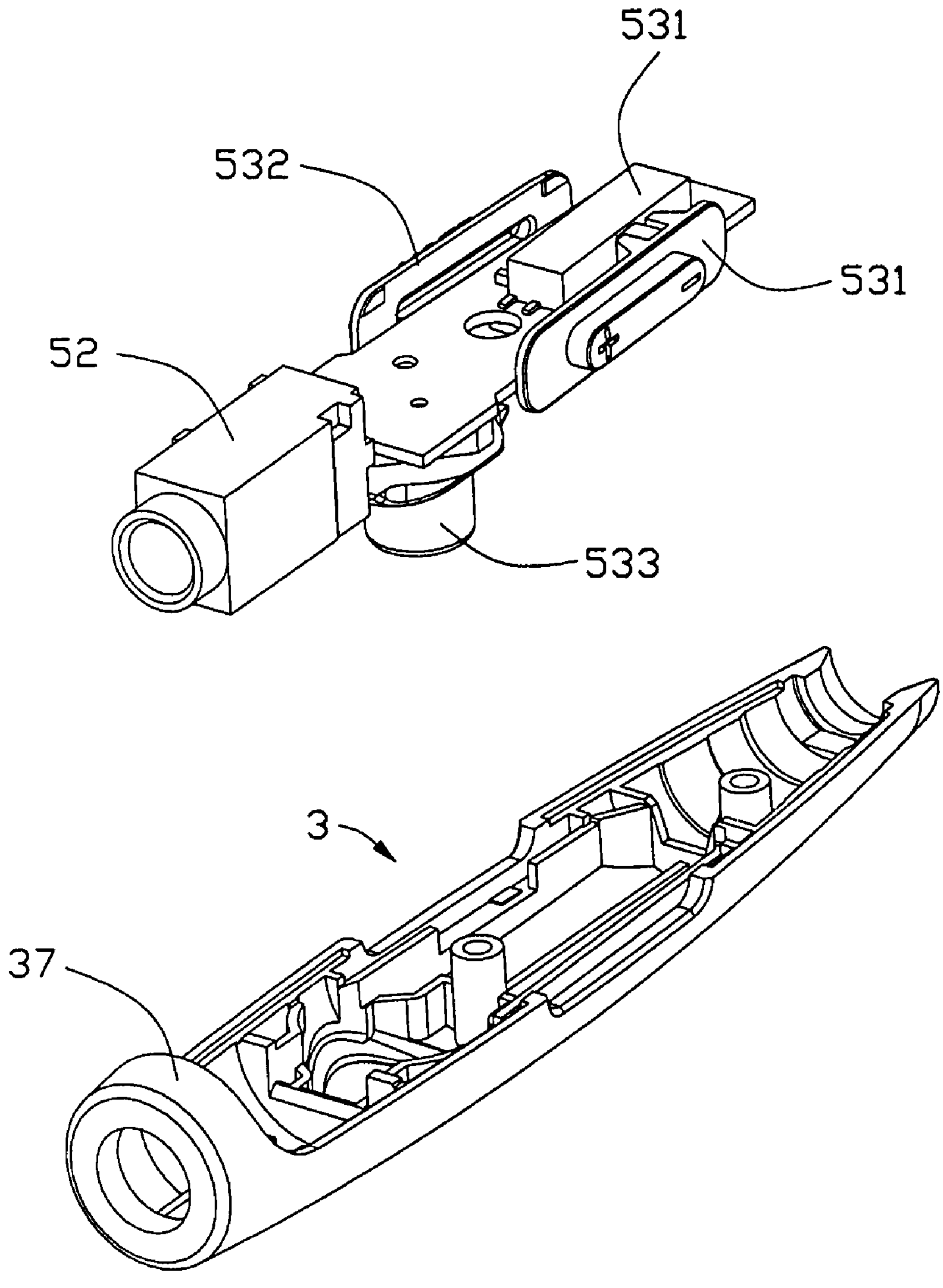
FIG. 5 is a perspective, partially assembled view of the remote control device shown in FIG. 1.
Figure 6:
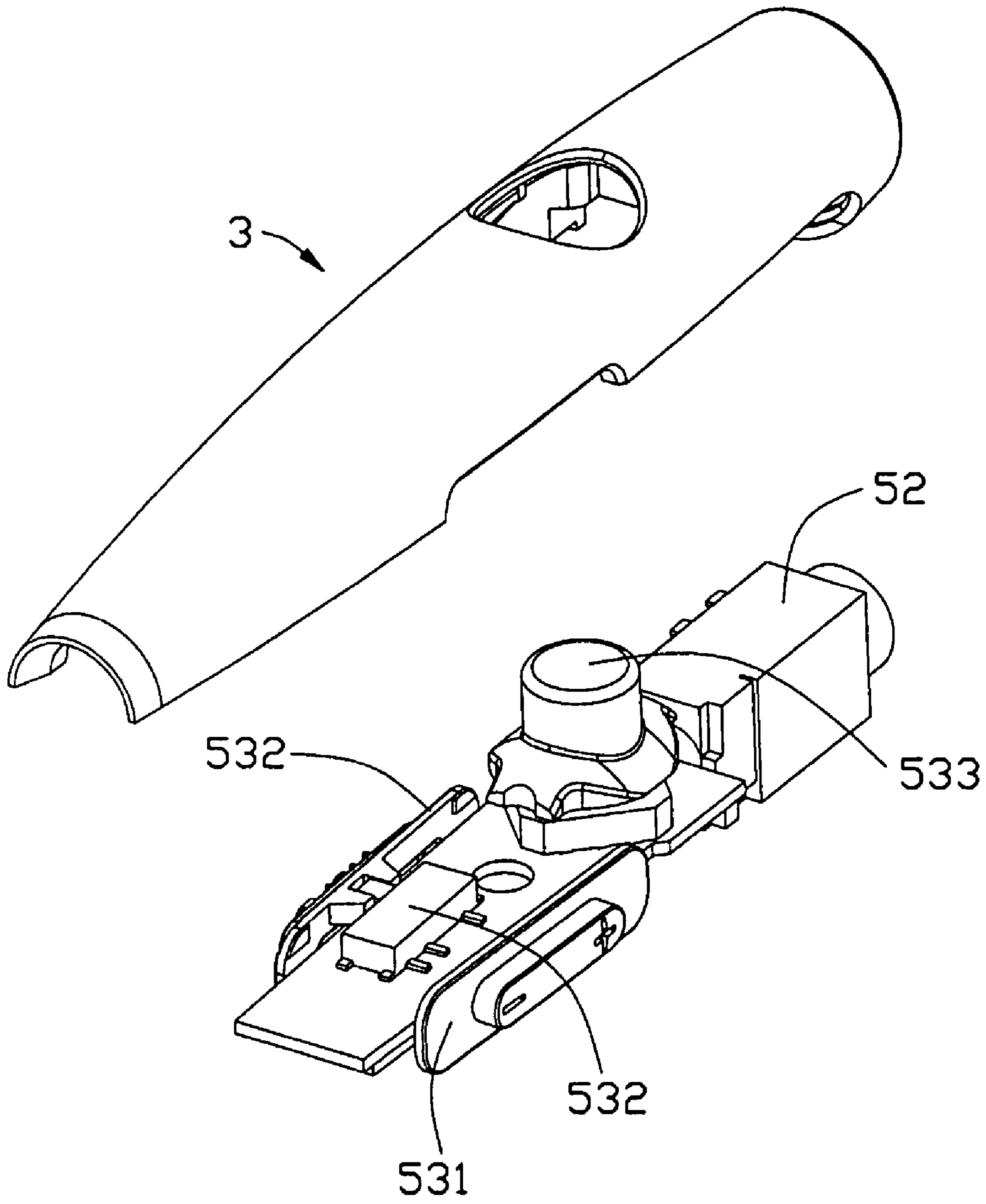
FIG. 6 is a view similar to FIG. 5, but taken from different aspect.
Figure 7:
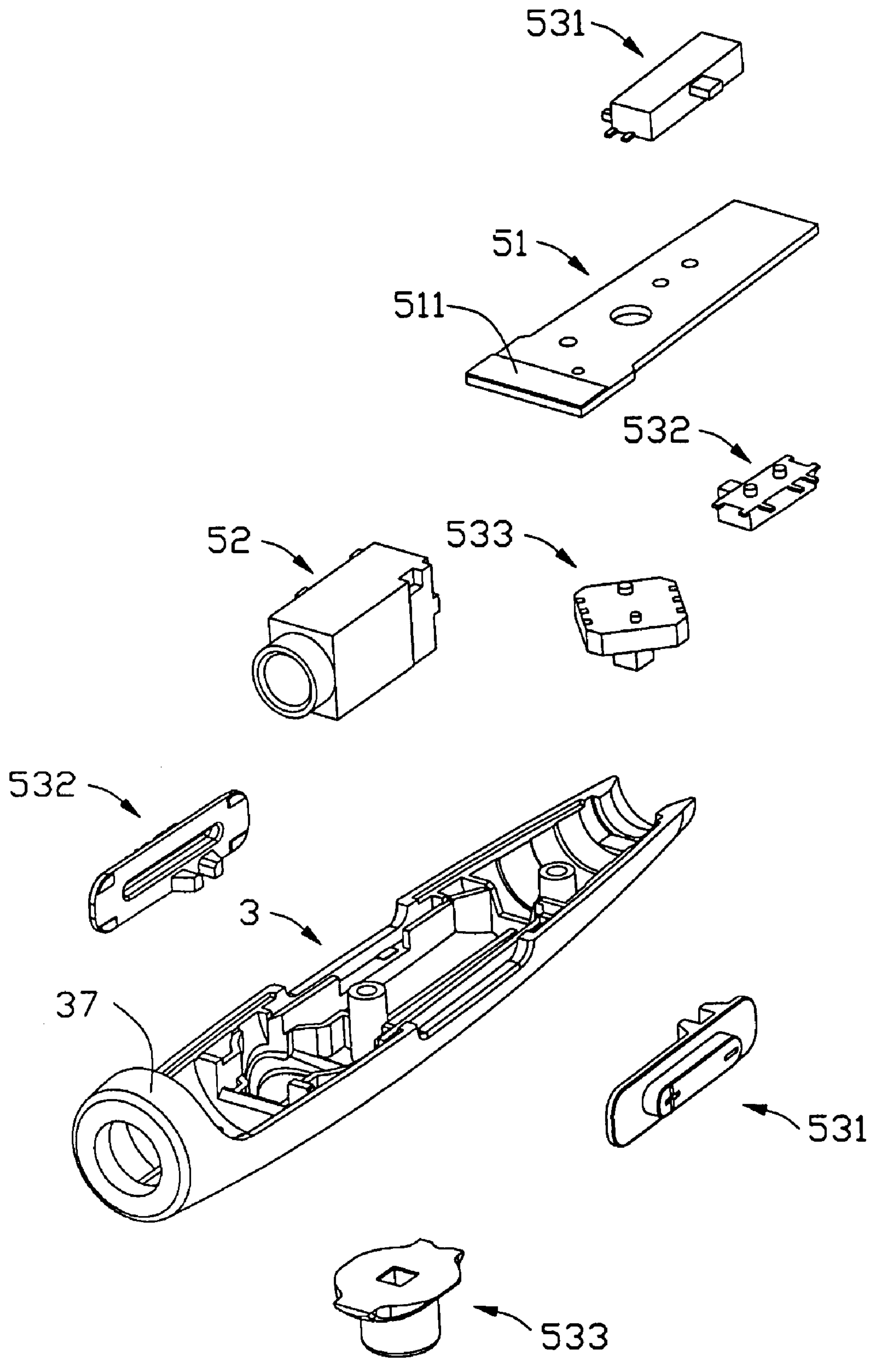
FIG. 7 is an exploded view of the remote control device shown in FIG. 5.
Figure 8:
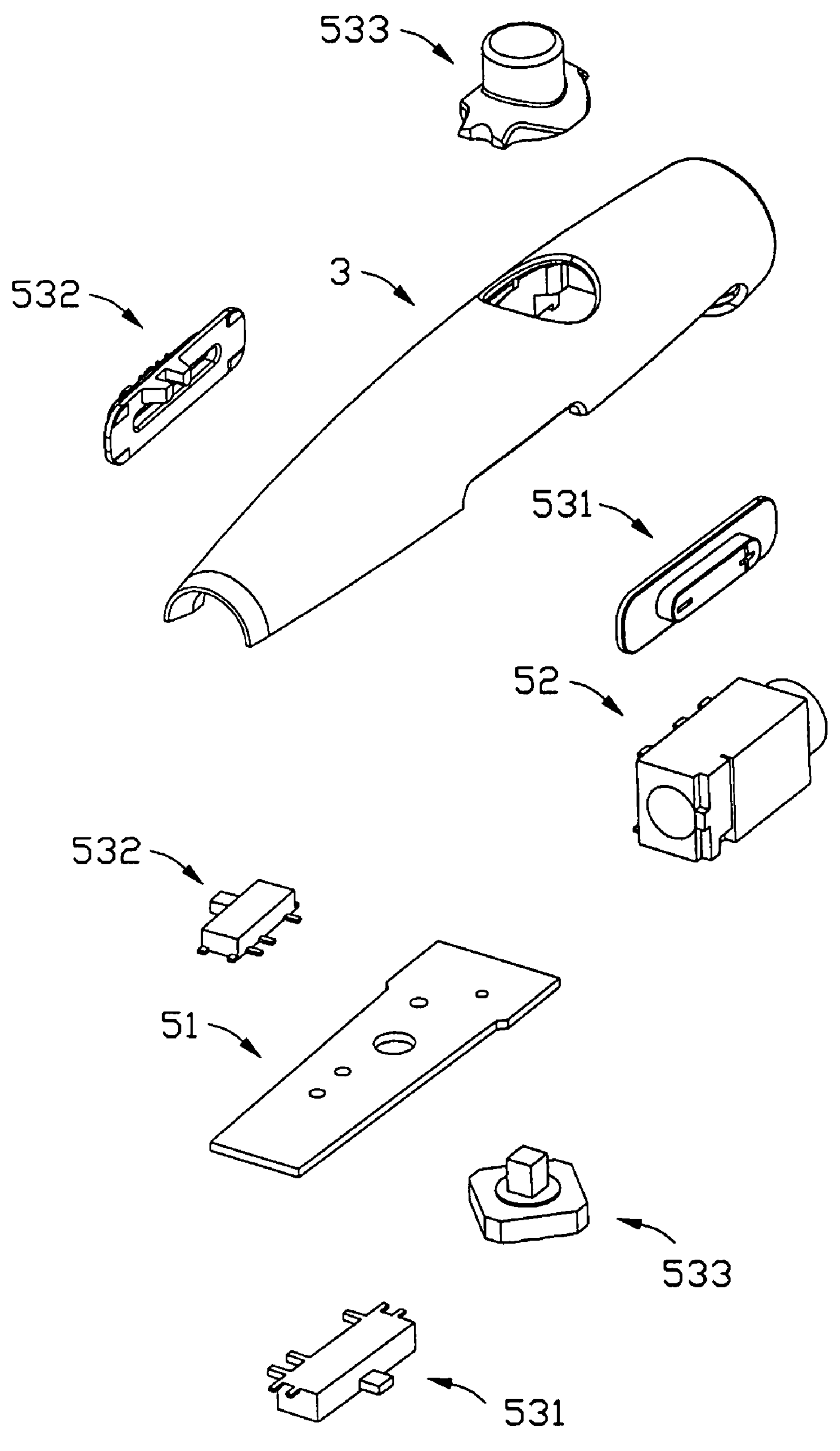
FIG. 8 is another view similar to FIG. 7, but taken from different aspect.

With respect to FIG. 5 and FIG. 8, the printed circuit board 51 comprises a first conductive pad 511 on front thereof, a plurality of trace (not shown) disposed thereon, and a plurality of second conductive pads (not shown) on rear thereof. At least a second conductive pad is electrically connected to the first conductive pad 511 by one trace for establishing an electrical connection therebetween.

With respect to FIG. 3, the cable 7 comprises a substantially V-shape securing member (not labeled) with a through hole 79 extending therethrough, a stress relief (not labeled) integrally molded with the securing member, and a plurality of conductors (not shown) extending through the securing member and the stress relief for connecting with the second conductive pad of the printed circuit board 51.

With respect to FIG. 3, the clip 6 comprises a longitudinal base (not labeled), and a pair of fixing pieces 61 upwardly extending from one end of the base. Each fixing piece 61 defines a hole 611 therein, which aligns with the locking hole 231 and a central hole (not labeled) of a spring 8. A pole 9 extends through the holes 611, 231 and the hole of the spring 8 for attaching the clip 6 to the first housing piece 2 and allowing the clip 6 to pivot upon the pole 9.

With respect to FIGS. 1-8, in assembly, first, the printed circuit board 51 is received in the second housing piece 3. Then, the conductors of the cable 7 are soldered with the second conductive pads, along with the V-shape securing member of the cable 7 being received in the second housing piece 3. In this embodiment, at least one conductor of the cable 7 is used to transmit grounding signal. After that, the first housing piece 2 is assembled to the second housing piece 3, with the three positioning piece 27 being received in the annular portion 37, and the flat top surface 2211 being electrically engaged with the first conductive pad 511 of the printed circuit board 5. For achieving a reliable connection between the first and second housing piece 2, 3, several screws 11, 12 are provided. Obviously, the first and second housing piece 2, 3 should provide corresponding holes to match with the screws 11, 12. In this preferred embodiment, a pair of posts (not labeled) each defining a hole 39 therein, extends upwardly from the inner surface of the second housing piece 3, and extends through the printed circuit board 5 and the through hole 79 of the cable 7. The pair of screws 11, 12 extend through the holes 29 of the first housing piece 2 and engage with the holes 39 of the second housing piece 3 respectively. Last, the clip 6 is assembled to the first housing piece 2.

With respect to FIGS. 5-8, in this preferred embodiment, the components received in the receiving space 4, also comprises a plug 52 located at the front of the remote control device 100 and with a plurality of contacts (not shown) being received therein for providing a way to connect with the earphone or the loudspeaker, a first slip switch 531 built on the printed circuit board 51 for controlling the sound volume of the portable audio device, a second slip switch 532 built on the printed circuit board 51 for selectively controlling the operations of other switches, and a button 553 built on the printed circuit board 51 for controlling Play/Pause of the portable audio device. In detail, when the second slip switch 532 is in a lock state, the other switches are out of use. Contrarily, in an unlock state, the other switches are in use. Obviously, other components, such as LED, which can be used to show titles of music, can be built in the receiving space 4 for providing a better service without departing from the spirit of present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A remote control device, comprising:

an insulated housing having first and second housing pieces engaging with each other, comprising an outer surface plated with a conductive material for providing a suppression of EMI, an inner surface, and a receiving space defined by the inner surface and disposed between the first and second housing pieces;

a printed circuit board received in the receiving space, and comprising at least a first conductive pad, and a second conductive pad electrically connected to the first conductive pad by conductive trace;

a cable comprising at least one grounding conductor electrically connected to the second conductive pad;

grounding means formed integrally with the inner surface of the insulated housing and electrically connected to the conductive material and the first conductive pad for providing a sheath for ESD generated on the remote control device; wherein the grounding means is plated with said conductive material for electrically connected with the conductive material of the outer surface.

2. The remote control device as described in claim 1, wherein the grounding means comprises a base projecting from the inner surface of the insulated housing and forming a flat top surface, and a pair of columns located at two lateral sides of the base, the flat top surface and the pair of columns are plated with said conductive material.

3. A remote control device, comprising:

an insulated housing comprising an outer surface plated with a conductive material for providing a suppression of EMI, an inner surface, and a receiving space defined by the inner surface;

a printed circuit board received in the receiving space, and comprising at least a grounding conductive pad;

a cable comprising at least one grounding conductor electrically connected to the conductive pad;

grounding means formed integrally with the inner surface of the insulated housing and plated with said conductive material, and electrically connected to the conductive material on the outer face and the grounding conductive pad for providing a sheath for ESD generated on the remote control device; wherein the grounding means comprises a base projecting from the inner surface of the insulated housing and forming a flat top surface, and a pair of columns located at two lateral sides of the base, the flat top surface and the pair of columns are plated with said conductive material; wherein said base defines in the opposite outer surface a recessed portion in which at least a fixing piece of a clip is pivotally received.

* * * * *